United States Patent
Lee (10) Patent No.: US 8,090,944 B2
(45) Date of Patent: Jan. 3, 2012

(54) METHOD AND APPARATUS FOR AUTHENTICATING USERS OF AN EMERGENCY COMMUNICATION NETWORK

(75) Inventor: Michael Lee, Ottawa (CA)

(73) Assignee: Rockstar Bidco LP, New York, NY (US)

( * ) Notice: Subject to any disclaimer, the term of this patent is extended or adjusted under 35 U.S.C. 154(b) by 1477 days.

(21) Appl. No.: 11/481,076

(22) Filed: Jul. 5, 2006

(65) Prior Publication Data

US 2008/0010674 A1    Jan. 10, 2008

(51) Int. Cl.
*H04L 9/32* (2006.01)
(52) U.S. Cl. ........ 713/168; 713/166; 713/170; 713/186; 713/182; 713/185; 379/37; 379/45; 379/308; 379/243; 726/4; 455/404; 455/410; 455/411; 455/450
(58) Field of Classification Search .................. 713/1, 2, 713/188, 194, 166, 170, 186, 168, 182, 185; 380/200, 201, 255, 277; 726/2, 3, 4; 379/37, 379/208.01, 221, 8, 143, 45, 308, 243; 455/404.1, 455/450, 410, 411
See application file for complete search history.

(56) References Cited

U.S. PATENT DOCUMENTS

| | | | |
|---|---|---|---|
| 6,687,823 B1 * | 2/2004 | Al-Salqan et al. ............ | 713/167 |
| 6,757,539 B2 * | 6/2004 | Kaibel et al. ................. | 455/445 |
| 6,845,453 B2 * | 1/2005 | Scheidt et al. | |
| 6,961,857 B1 * | 11/2005 | Floryanzia ..................... | 726/14 |
| 7,079,484 B2 * | 7/2006 | Phan et al. .................... | 370/225 |
| 7,131,009 B2 * | 10/2006 | Scheidt et al. | |
| 7,137,002 B2 * | 11/2006 | Goldman ..................... | 713/170 |
| 7,178,025 B2 * | 2/2007 | Scheidt et al. ............... | 713/168 |
| 7,340,042 B2 * | 3/2008 | Cluff et al. | |
| 7,451,202 B2 * | 11/2008 | Nakahara et al. ............ | 709/223 |
| 7,508,954 B2 * | 3/2009 | Lev | |
| 7,519,598 B2 * | 4/2009 | Stewart et al. ....................... | 1/1 |

(Continued)

FOREIGN PATENT DOCUMENTS

JP    11306351 A  * 11/1999

OTHER PUBLICATIONS

"GETS Government Emergency Telecommunications Service" Information from the U.S. Department of Homeland Security (4 pages), Jan. 7, 2005.

(Continued)

*Primary Examiner* — Zachary A Davis
*Assistant Examiner* — Joseph Pan
(74) *Attorney, Agent, or Firm* — Anderson Gorecki & Manaras LLP (57) ABSTRACT

An authentication system is configured to weight multiple available network supplied and user supplied authentication factors to determine whether a user should be provided with access to an Emergency Communication Network (ECN). The multiple factors may include the location of the user, MIN, short PIN, token, biometric information, and other information. The level of access to be provided to the user may be tiered based on the authentication level achieved during the weighting process. Authentication information may be shared between groups of individuals, so that the authentication requirements for group members may be reduced as other members of the group supply authentication information to the ECN. Group authentication may be used to enable group services such as conferencing and push-to-talk to be set up automatically for the group.

18 Claims, 3 Drawing Sheets

U.S. PATENT DOCUMENTS

| | | | |
|---|---|---|---|
| 7,580,919 B1* | 8/2009 | Hannel et al. | 1/1 |
| 7,593,943 B2* | 9/2009 | Clarke et al. | 1/1 |
| 7,596,103 B2* | 9/2009 | Shaffer et al. | 370/260 |
| 7,664,233 B1* | 2/2010 | Kirchmeier et al. | 379/37 |
| 2002/0027982 A1 | 3/2002 | Plunkett et al. | |
| 2005/0034079 A1* | 2/2005 | Gunasekar et al. | 715/753 |
| 2005/0044042 A1* | 2/2005 | Mendiola et al. | |
| 2005/0114447 A1* | 5/2005 | Cameron et al. | 709/204 |
| 2005/0268111 A1 | 12/2005 | Markham | |
| 2005/0278420 A1* | 12/2005 | Hartikainen et al. | 709/203 |
| 2005/0278775 A1* | 12/2005 | Ross | |
| 2006/0050870 A1* | 3/2006 | Kimmel et al. | |
| 2006/0204051 A1* | 9/2006 | Holland | 382/115 |
| 2006/0229090 A1* | 10/2006 | LaDue | |
| 2006/0274774 A1* | 12/2006 | Srinivasan et al. | 370/420 |
| 2006/0288229 A1* | 12/2006 | Hamid et al. | 713/182 |
| 2007/0036400 A1* | 2/2007 | Watanabe et al. | 382/124 |
| 2007/0067642 A1* | 3/2007 | Singhal | 713/186 |
| 2007/0136573 A1* | 6/2007 | Steinberg | |
| 2007/0150747 A1* | 6/2007 | Mani et al. | |
| 2007/0186106 A1* | 8/2007 | Ting et al. | |
| 2007/0242824 A1* | 10/2007 | Vishik | |
| 2007/0245151 A1* | 10/2007 | Phoha et al. | 713/186 |
| 2007/0258440 A1* | 11/2007 | Watanabe | 370/352 |
| 2007/0280464 A1* | 12/2007 | Hughes et al. | 379/205.01 |
| 2008/0015986 A1* | 1/2008 | Wright | 705/44 |
| 2008/0052514 A1* | 2/2008 | Nakae | 713/168 |
| 2008/0159511 A1* | 7/2008 | Keohane et al. | 379/202.01 |
| 2010/0061539 A1* | 3/2010 | Cloran et al. | 379/202.01 |

OTHER PUBLICATIONS

K. Carlberg, "General Requirements for Emergency Telecommunication Service (ETS)", Internet Engineering Task Force (IETF) Request for Comments (RFC) 3689, Feb. 2004, (10 pages).

K. Carlberg, "Framework for Supporting Emergency Telecommunications Service (ETS) in IP Telephony" IETF RFC 4190, Nov. 2005 (27 pages).

F. Baker, et al., "Implementing an Emergency Telecommunications Service for Real Time Services in the Internet Protocol Suite", IETF Internet Draft (ID), draft-ietf-tsvwg-mlpp-that-works-04, Feb. 27, 2006 (43 pages).

* cited by examiner

METHOD AND APPARATUS FOR AUTHENTICATING USERS OF AN EMERGENCY COMMUNICATION NETWORK

BACKGROUND OF THE INVENTION

1. Field of the Invention

The present invention relates to communication networks and, more particularly, to a method and apparatus for authenticating users of an emergency communication network.

2. Description of the Related Art

In a serious disaster, such as a hurricane, flood, earthquake, or terrorist attack, it may be essential for emergency personnel to have access to a telephone network so that the response to the disaster may be coordinated. At the same time, people affected by the disaster may swamp the network with telephone calls thereby making it difficult for the emergency personnel to obtain access to the network. To ensure that emergency personnel are able to receive priority access to available network resources, a separate access system has been developed, which is commonly referred to as the Government Emergency Telecommunications Service (GETS).

The GETS is an emergency communications service designed to be used when national security and emergency personnel are unable to complete emergency calls through the regular telecommunication system. GETS uses the infrastructure of the Public Switched Telephone Network (PSTN) and wireless networks, but provides priority treatment and enhanced routing capabilities to increase the likelihood of a GETS call being able to be connected on the network. The GETS system is described in greater detail in Internet Engineering Task Force (IETF) Request For Comments (RFC) 3689 and 4190, and IETF Internet Draft (ID) draft-ietf-tsvwg-mlpp-that-works-04, the content of each of which is hereby incorporated herein by reference.

The wireless version of the GETS is referred as the Nationwide Wireless Priority Service (WPS). WPS provides a user with the ability to be placed at the top of the queue so that the WPS user will be provided with the next available channel from their closest cell once a channel becomes available. This enables WPS users to have priority access to wireless channels so that their calls can go through during the emergency.

Access to the GETS/WPS system is controlled through a dialing plan and Personal Identification Number (PIN) system. The user dials a universal access number using common telephone equipment such as a land line telephone call or a wireless telephone. Once connected, the user will be prompted to enter a specific long PIN number (e.g. 12 to 32 digits) followed by the telephone number of the person that the GETS/WPS user would like to call. If the PIN is correct, the call may be placed on the emergency network. If not, the user will be denied access to the GETS.

Emergency situations may be very stressful, which may make it difficult for a user to correctly remember the long PIN required to access the network. Particularly where the user is not accustomed to remembering the long PIN, the increased stress associated with the emergency situation may make it difficult for the user to remember their long PIN. Accordingly, users may often write their long PIN on a piece of paper or card which may be referenced during the emergency to enable them to access the GETS. Unfortunately, the user may not have access to the card when it is necessary to make an emergency telephone call. Additionally, there are restrictions on the way in which the long PIN may be stored. For example, government security regulations may prohibit the long PIN from being pre-programmed into a mobile phone, since the long PIN may be considered to be classified information. Similarly, even if the phone is pre-programmed with the long PIN the user may not have access to their own phone during the emergency situation.

In addition to problems remembering and dialing a long string of digits under stressful emergency conditions, reading and dialing a long number may take a relatively long time. For example, dialing a long 12-32 digit PIN may take on the order of 20-30 seconds. While this amount of time may be insignificant under normal circumstances, it may be more important during a crisis. Accordingly, it would be advantageous to provide another way to authenticate users seeking to access an emergency communication network.

SUMMARY OF THE INVENTION

A method and apparatus for authenticating users of an emergency communication network includes an authentication system configured to weight multiple available authentication factors to determine whether the user is an authorized user of the emergency communication network. The multiple factors may include the location of the user, a mobile telephone identification number, a token, a short 4-6 digit PIN, biometric information obtained by the user's telephone such as a fingerprint or retinal scan, voice identification information, speech identification information, and other factors that may tend to identify the user as a valid user of the ECN. The ECN may be the GETS/MSN or another emergency telephone network, either based on the current PSTN and wireless network, or based in future on the emerging voice (or multimedia) over IP (VoIP) systems. The authentication factors are collected and weighted to determine whether the user is sufficiently authenticated to access the ECN. Optionally, the method and apparatus may perform an initial determination and, if the user is insufficiently authenticated, may prompt the user for additional authentication information.

The amount of access provided to the user may be tiered based on the level of authentication for that user. For example, a user that remembers an entire long pin may be provided with the highest level of access or priority, while an user that remembers only 4 bits of the long pin may be provided with a relatively lower level of access to the ECN.

Authenticating the user in connection with a particular land line or wireless telephone enables the ECN to associate the land line or wireless telephone with the network so that inbound calls to that telephone may be handled via the ECN. This enables calls placed on the regular telephone network to be provided with the features of the ECN where the destination of the telephone call has been authenticated on the ECN network.

According to yet another embodiment of the invention, authentication information may come from contemporaneous use of the ECN by other members of a group, so that the authentication requirements of group members may be reduced as other members of the group authenticate with the ECN. In this embodiment, groups of individuals may be partially authenticated on the ECN as a result of the authentication of other members of the group, so that the group members may all use the ECN resources without all individually authenticating on the ECN. As the members of the group authenticate with the system, the collective authentication information received from the members of the group may be used to authenticate the remaining members of the group, so that fewer than all of the group members are required to provide full authentication information to obtain services associated with the emergency communication network. In addition, the ECN may create a voice or multimedia conference for users belonging to a group and authenticated as a group. This may allow new services such as push-to-talk group services, telephone conferences, in-bound dialing, and other services to take place on the ECN, either in the wireless or wired domain.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
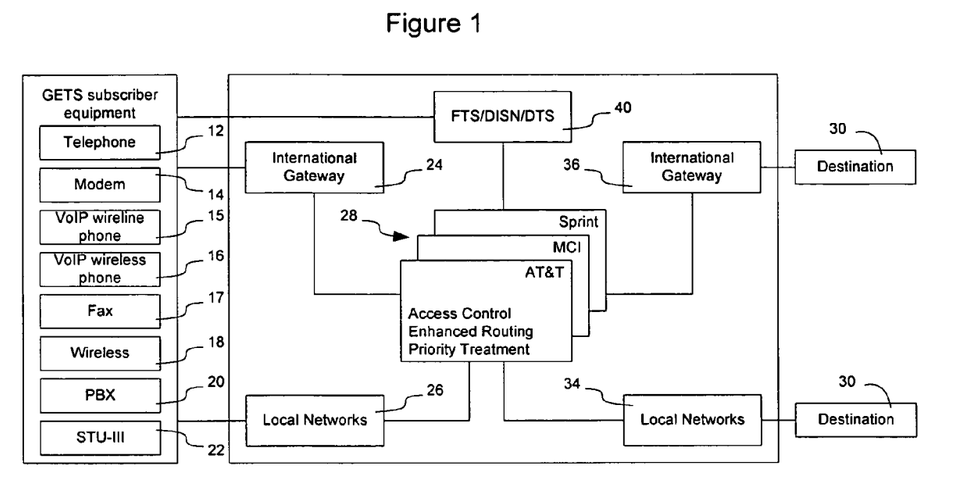
FIG. 1 is a functional block diagram of the GETS architecture.

FIG. 1 illustrates the basic GETS architecture. Although an embodiment of the invention will be described in connection with the GETS architecture, the invention is not limited to this particular embodiment as other embodiments of the invention may be used to provide access to other emergency communication networks. For example, the invention may be used with the WPS and other emergency communication networks. The invention may also be used on deployed networks such as the PSTN or wireless networks, or may be deployed in connection with emerging voice and multimedia over IP networks in a similar manner. In the following description, the term "Emergency Communication Network" (ECN) will be used generically to refer to systems such as the GETS system, the WPS, other priority access systems, and dedicated networks of communication equipment that may be in existence or developed to provide emergency communication services. Thus, while embodiments of the invention may be advantageously employed with the GETS system, the invention is not limited in this manner as embodiments of the invention may also be employed in other situations as well.

As shown in FIG. 1, users of an ECN may use many different types of subscriber equipment 10 to access the ECN. For example, an ECN user may use a telephone 12 connected to a fixed land line to access the ECN. Similarly, the ECN user may use a modem 14 associated with a computer to enable the computer to communicate over the network. ECN users may also use other types of equipment, such as a Voice over Internet Protocol (VoIP) wireline phone 15 or VoIP wireless phone 16, a facsimile machine 17, a wireless telephone 18, or a public branch exchange 20, for example where the user is located in a building that provides access to shared telephone resources via a PBX.

The ECN user may also use a special secure telephone 22, such as a Secure Telephone Unit, third generation (STU-III) that may be switched between normal mode and secure mode. A secure telephone of this nature enables classified information to be discussed over the telephone, which would otherwise not be permitted using a standard telephone such as telephone 12, VoIP phone 15, 17, or wireless phone 18.

The ECN subscriber equipment may connect via an international gateway 24 or a local network gateway 26 to obtain access to the telephone resources that are provided in that area. For example, the GETS is a system that provides priority access to telephone resources rather than a separate network. Accordingly, the underlying network resources 28 in the GETS system are the same as those commonly employed by residents in the area to make telephone calls or otherwise communicate with each other. Other ECNs may have different configurations, for example may be wholly or partially formed of dedicated network resources, and as such the underlying network configuration may be somewhat different depending on how the ECN is set up.

The ECN is maintained in a constant state of readiness which maximizes the use of all of the available network resources 28 in the event of congestion or outages caused by an emergency, crisis, or war. For example, the network resources 28 may provide special access control to ECN users, enhanced routing for ECN calls, and priority treatment to the ECN users. The call will be routed to the intended destination 30 via further local networks 32 or an international gateway 36 so that the telephone call can be completed.

In general, authentication services on a network are provided by one or more authentication servers. The authentication servers are responsible for determining whether a user is who they are purporting to be. An authentication server may also determine whether a user is authorized to take particular actions on the network. In the GETS system, authentication services are provided by causing a call to be connected to the Federal Technology Service (FTS)/Defense Switched Network (DISN)/Diplomatic Telecommunications Service (DTS) 40. The FTS/DISN/DTS is responsible for authorizing users and determining which users should have access to the GETS. Where the ECN is separate from the GETS system, an authentication server on the ECN may perform these functions. In the following description, the term "authentication server" will be used to refer to any computing device that is configured to perform authentication services on an ECN.

To obtain access to the GETS network, a user conventionally was required to enter a long PIN. According to an embodiment of the invention, authentication on an emergency communication network may be performed by using a weighted authentication system in which multiple available authentication factors are considered to determine whether the user should be allowed to use the ECN. By looking at available authentication factors, the authentication server can make an authentication determination without requiring the user to input a long PIN.

Figure 2:
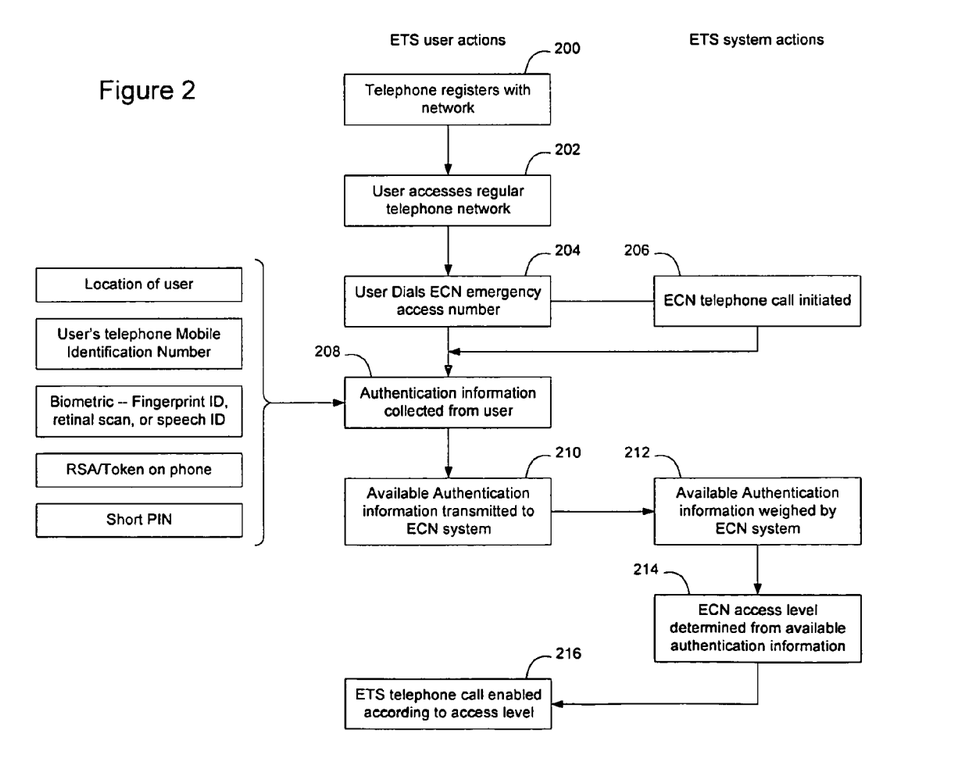
FIG. 2 is a flow chart illustrating an example process of authenticating users of an emergency communication network according to an embodiment of the invention.

FIG. 2 shows a flow chart of a process that may be used to obtain access to an ECN. The invention is not limited to this particular sequence, however, and the process shown in FIG. 2 is provided merely as a particular example of how a multi-factor authentication process may be used in connection with enabling access to an emergency communication network. As shown in FIG. 2, subscriber equipment such as the subscriber equipment discussed above in connection with the GETS architecture shown in FIG. 1 will register with the network (200). The registration process is a standard process and the invention is not intended to alter the manner in which the subscriber equipment interacts with the underlying equipment forming the communication network.

When the ECN user desires to make a call on the ECN network, the user will access the regular telephone network (202) such as by causing a handset to go off-hook, and dial an ECN emergency access number (204), for example by dialing a telephone number associated with the ECN. Different ECNs may have other ways of obtaining access and the invention is not limited to any particular way in which access to the ECN is accomplished. Similarly, the processes (200-204) may be reversed or performed in any desired order, and additional processes may be invoked as well, and the invention is not limited to the particular manner in which the user is initially connected to the ECN.

When the user accesses the ECN (204), the phone equipment on the network will recognize the call as an ECN emergency call and connect the call and an ECN emergency call will be initiated (206).

In connection with placement of the ECN call, authentication information will be collected from the user (208). Optionally, as discussed in greater detail below, authentication information may also be collected from other users that are contemporaneously authenticating with the ECN so that authentication of groups of users may take place. Collection of authentication information may be performed at any stage of the process illustrated in FIG. 2 and the invention is not limited to the particular manner in which the authentication information is collected. Thus, for example, authentication information may be collected in connection with registering the telephone on the network, prior to accessing the network, or in connection with dialing the ECN emergency access number. The invention is therefore not limited to an embodiment in which the authentication information is collected only once the telephone call has been initiated.

According to an embodiment of the invention, several different types of authentication information may be collected and used by the ECN to determine whether access should be granted to the ECN user.

For example, the system may collect multiple factors including something a person knows, such as a password or pass phrase, something the person has such as a magnetic strip card, smart card, or cell phone, and something that the person is, such as a biometric measurement (e.g. finger print or retinal scan). Some of the factors may be supplied by the network, using knowledge of end user terminals and/or location of terminal equipment. Other factors may be provided by the user, such as the user's simple PIN code, spoken password, or biometric information. Also, where group authentication is to be used, one or more of the factors may be provided by the other users of the ECN. A flexible combination of these factors depending on their availability may then be used to replace the single factor long PIN access code used in current implementation of the GETS system.

Several of the authentication factors can be supplied by the network. For example, when a user calls an ECN access number, the wireline or wireless network may collect information about the phone and pass it to the authentication server. If the user is calling via a wired network, the calling line ID and name information may sent to the authentication server and used by the authentication server as part of the authentication process. If the user is dialing from a mobile network, the mobile network may supply the calling line ID/name information associated with the cell phone (if available) and may also supply the Mobile Identification Number (MIN) or International Mobile Subscriber Identity (IMSI) numbers associated with the cell phone. The network may also supply the authentication server with the user's location when known—location information is a capability currently being implemented in cellular and wireless networks.

Other authentication factors may be supplied with the user, rather than the network. For example, the wired or wireless access device may also make biometric measurements of the user such as the user's fingerprint which can be performed by hardware on a handset. Alternatively, the user's retina scan, which may be conveniently performed by a camera and associated equipment in a video phone, may be supplied and used by the authentication server. One or more of these network supplied factors may be used in the authentication process.

The authentication server may also ascertain or request further factors from the user for authentication. For example, if the authentication server is satisfied with the factors the network has presented, it may simply prompt the user for a simple 4-6 digit short PIN keypad entry. As used herein, the term "short PIN" will be used to refer to a PIN that is up to 6 digits in length. The term "long PIN" will be used to refer to a PIN that is typically 12-32 digits in length, although which could also be longer than 32 digits. Alternately, or in combination, the authentication server may make a request for a spoken password from the user and use voice recognition to ascertain its validity. The authentication server may also make a biometric measurement on the user, for example by performing a voice recognition analysis of the caller's spoken words. One or more of these supplied factors may be used in the authentication process at the authentication server. The authentication algorithm is weighted since it is known that some factors such as speech recognition are not perfect or the speech sample taken may render a less than certain match, and may therefore be weighted less than other factors.

FIG. 2 illustrates several different types of information that may be collected and use by the authentication server to authenticate the user. As shown in FIG. 2, the location of the user may be used to determine if the user is in an area that is currently experiencing emergency conditions. In a natural disaster, such as an earthquake or tornado, the area affected by the emergency may be fairly well defined. A call placed from within a disaster area may be assumed to be more likely to be generated by a legitimate ECN user and, hence, may be more likely to be associated with an authorized use of the ECN system. The location information may be obtained, for example, from GPS or cellular triangulation information associated with the wireless telephone, a known termination location associated with a fixed land line, or in another manner.

Where the ECN is accessed from a mobile telephone, the mobile identification number of the telephone may be used to determine whether the mobile phone is associated with an authorized user of the ECN system. Specifically, during the registration process, each registered user may associate a particular mobile communication device, such as a cellular telephone, with their ECN access account. When that telephone is later used to place a call on the ECN system, the mobile identification number may be checked to determine whether the telephone being used is associated with an authorized user of the ECN system.

The mobile phone may also be configured to collect biometric information such as a fingerprint scan, a retinal scan, or voice signature from the user. The raw biometric data may be transmitted to the authentication server or locally compared by the mobile phone with expected biometric information.

Where the comparison is locally compared, the mobile telephone may assert to the network that the user of the phone is the user that has been registered with the ECN system. This may be done by causing the phone to provide the long PIN on behalf of the user upon completion of a positive fingerprint scan.

Optionally, the user may also provide additional information, such as a short personal identification number, whatever digits of the standard long PIN that they remember, a spoken codeword, or a token such as a time-varying code associated with an RSA security device. Still further, the user may possess an RFID tag that may be read by the mobile phone or a RFID reader to verify that the user possesses the correct RFID signature. Any of this information may be provided to the authentication server to enable the authentication server to determine that the person using the subscriber equipment is a valid user of the ECN system.

Combinations of multiple factors also may be used by the ECN authentication system to determine whether an ECN access should be allowed. For example, the ECN authentication system may determine that a call is being placed by a wireless telephone that is within a known disaster area, and then determine that the mobile identification number of that telephone is associated with an authorized user or a group of authorized users. The combination of these two factors may make it more likely that the attempted access is a legitimate use of the ECN system.

Once the authentication information has been collected from the user (208) the available authentication information is transmitted to the ECN system (210). The raw authentication information may be transmitted to the ECN system or information derived from the raw authentication information may be transmitted to the ECN authentication server. For example, the subscriber equipment may perform a fingerprint scan and transmit the results of the fingerprint scan to the authentication server associated with the ECN system. Alternatively, the subscriber equipment may perform the fingerprint scan and perform a comparison with an expected fingerprint signature locally. The result of the comparison may then be transmitted to the authentication server or, if the result is positive, the standard long PIN may be transmitted to the authentication server on the user's behalf.

Once the ECN system has received the available authentication information, the ECN system will weight the various pieces of authentication information to determine whether the user should be allowed to obtain access to the resources associated with the ECN system (212). For example, the authentication server may determine whether the user is in a disaster zone, whether the subscriber equipment is a piece of subscriber equipment known to be associated with an authorized user, whether there is any indication that the user is the user that commonly uses that piece of equipment, and also weigh any other positive or negative factors.

As a result of the weighting process, the authentication server may determine an access level to be granted to the user in connection with this access attempt (214). For example, the authentication server may determine that the user is an authorized user with a 90% certainty rate. Based on this determination, the authentication server may grant access to the ECN system and allow the user to make ordinary telephone calls using the ECN system. However, the system may require a heightened level of certainty, such as a 95% certainty, to receive calls using ECN resources. Accordingly, differentiated access may be provided depending on the level of certainty associated with the authentication process. Similarly, the priority level of the person in a queue for network services may be adjusted based on the authentication certainty. For example, a user with a higher authentication level may be granted access above those with lower authentication certainty.

Once the authentication process has completed, the ECN access will be completed according to their access level (216). The call or multimedia session may be completed in a standard manner and the invention is not limited to the particular manner in which the user chooses to utilize the network resources.

Figure 3:
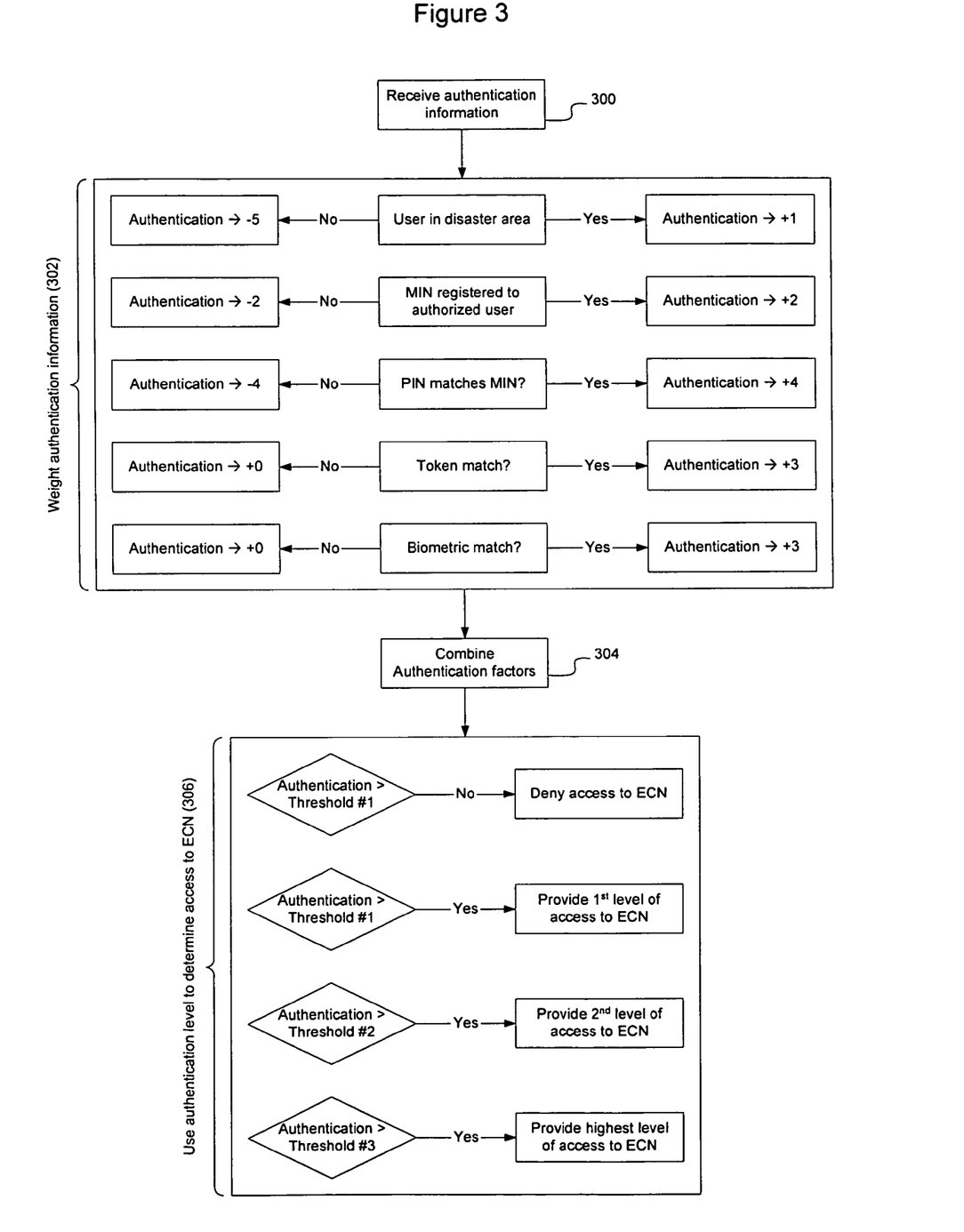
FIG. 3 is a flow chart illustrating an example process performed by an authentication server to authenticate users of an emergency communication network according to an embodiment of the invention.

FIG. 3 illustrates one example of a process that may be used by an authentication server to combine multiple authentication factors to determine a level of access to be provided to the ECN system. Although a particular example will be provided in connection with FIG. 3, the invention is not limited to this particular embodiment as many different ways of using the multiple authentication factors may be used as well without departing from the invention.

In the example shown in FIG. 3, when the authentication server receives the authentication information (300) it will weight the authentication information (302), combine the authentication factors (304), and then use resultant authentication level to determine a level of access to be provided to the user (306). For example, in connection with weighting the authentication factors, the authentication server may allocate a particular value to the authentication information depending on whether the user is in a disaster area or not. For example, in the illustrated embodiment if the user is in a disaster area the authentication server will allocate a value of +1 based on this fact. If the user is not in a disaster area, the authentication server may allocate +0 or may deduct a particular value, for example −5.

Similar weighting processes may be performed for other available authentication factors. For example, the authentication server may look to determine whether the Mobile Identification Number (MIN) is associated with a registered authorized user of the ECN system, whether the PIN matches a PIN associated with the user that is registered with the MIN, whether there is any token information and whether the token matches, and whether there is biometric information that may help provide information about the user of the telephone.

The various present authentication factors are assigned weights that then may be combined to determine an authentication level for the user. The function used to combine the factors may be determined according to policy to be implemented by the authentication server. For example, the factors may be added together, may be multiplied by scaling factors and added together, or may be otherwise combined. For example, assume that the policy was to automatically admit any mobile telephone in a disaster area where the MIN matched a registered MIN. The authentication server could implement this policy by combining the result of the first two weighting processes and determining if these two processes had a additive result of authentication=3. If so, the process of combining the authentication factors could result in an authentication value sufficiently large to enable access to the ECN. Multiple equations may be used to enable the available factors to be used to authenticate a user, and the invention is not limited to any particular set of equations.

In the embodiment shown in FIG. 3, the weighting occurs in two different steps. Specifically, when the authentication information is evaluated, a weighting occurs to assign authentication values to the authentication information. A second weighting process may occur when combining the authentication factors, for example by causing different functions to be used in connection with combining different selected authentication values to determine whether the user should be admitted to the ECN. The step of combining may thus result in several different authentication values based on combinations of factors. The invention is not limited to the particular embodiment shown in FIG. 3, as other ways of evaluating the authentication information may be used as well. For example, a single process may be used to weight and combine the various authentication factors. Similarly, although particular values have been provided and examples of different aspects of authentication information have been used to help provide a concrete understanding of how the invention may operate in a particular context, the invention is not limited by these particular details as other implementations may use different types of authentication information combined in different ways to implement different policy concerns.

Once the authentication factors are combined to obtain one or more authentication values, the authentication values are compared with one or more thresholds to determine whether the user should be provided with access to the ECN system and, optionally, what level of access should be provided to the ECN system. For example, as shown in FIG. 3, the authentication server may compare the highest authentication value with a first threshold to determine if the authentication value is above a first threshold. If not, the authentication server may deny access to the ECN system. If so, the authentication server may provide a first level of ECN system access to the user. Where differentiated levels of access are available on the ECN system, the authentication server may similarly check the authentication value(s) against other thresholds to determine which level of access should be provided to the user.

Optionally, the thresholds may be adjustable by the network administrator to enable the network administrator to change the way in which users are able to obtain access to the ECN during an emergency. Providing the network administrator to adjust the thresholds may enable the network administrator to optimize the manner in which the network resources are used during the emergency by allowing the network administrator to make it easier/harder for users to obtain access to the ECN.

The authentication server may use the highest authentication value computed during the step of combining the authentication factors, the lowest authentication value obtained in this process, or several of the authentication values. For example, the authentication server may require all authentication values to be above a particular threshold to provide second and third level access to the ECN system. This may be useful, for example, where there is a high likelihood that an authorized user of the ECN system is likely to have had their cellular telephone stolen.

By combining authentication factors available from the network and from the user in a flexible weighted authentication process, the authentication server is able to provide strong authentication services without requiring the user to remember a long PIN. Additionally, the authentication may be done quickly to hopefully increase the speed with which an authorized user of the network may access ECN network resources.

Although an embodiment of the invention has been described in connection with a user making a telephone call, the invention is not limited in this manner. Rather, any subscriber equipment may be authenticated using the multi-factor authentication process described herein. For example, a user may log into an Instant Messaging (IM) service and obtain access to the ECN services using the IM client. Thus, by using a multi-factor authentication process it may be possible to provide enhanced services such as instant messaging over the ECN or enabling talk groups to be formed without requiring the user to authenticate in connection with each message, so that emergency response personnel can coordinate response efforts. Similarly, a user may use the multi-factor authentication process described herein to access a video or voice over IP or other multimedia service.

Enabling multi-factor authentication may additionally enable a user to be sufficiently authenticated on the ECN to enable in-bound calls to the user to be handled by the ECN, even when those calls are not made by an authorized user of the ECN. For example, when a user authenticates with the ECN using the multi-factor process described herein, the ECN may retain authentication information for that user for a period of time. When another person would like to call the user, the person may call the universal ECN access number and dial the number of the person they would like to talk to. If the person they have dialed has recently authenticated on the ECN, the call may be placed on the ECN without requiring the person making the telephone call to authenticate with the ECN. Thus, as long as one of the parties has authenticated on the ECN within a given period of time, the communication session may take place on the ECN. This enables in-bound calls to an authorized user of the ECN to take place without requiring the person making the telephone call to authenticate on the ECN.

Where a call is allowed to take place on the ECN without requiring the person making the call to authenticate with the ECN, a possibility exists that spurious persons may attempt to make multiple phone calls or otherwise clog the ECN with inbound traffic to emergency personnel. Accordingly, the emergency personnel may provide feedback to the ECN e.g. via a code or otherwise, to enable the ECN to learn that spurious inbound calling has been taken place. This feedback may then be used by the ECN to deny access to the ECN for particular callers or to temporarily deny all inbound traffic over the ECN without authentication.

Figure 5:
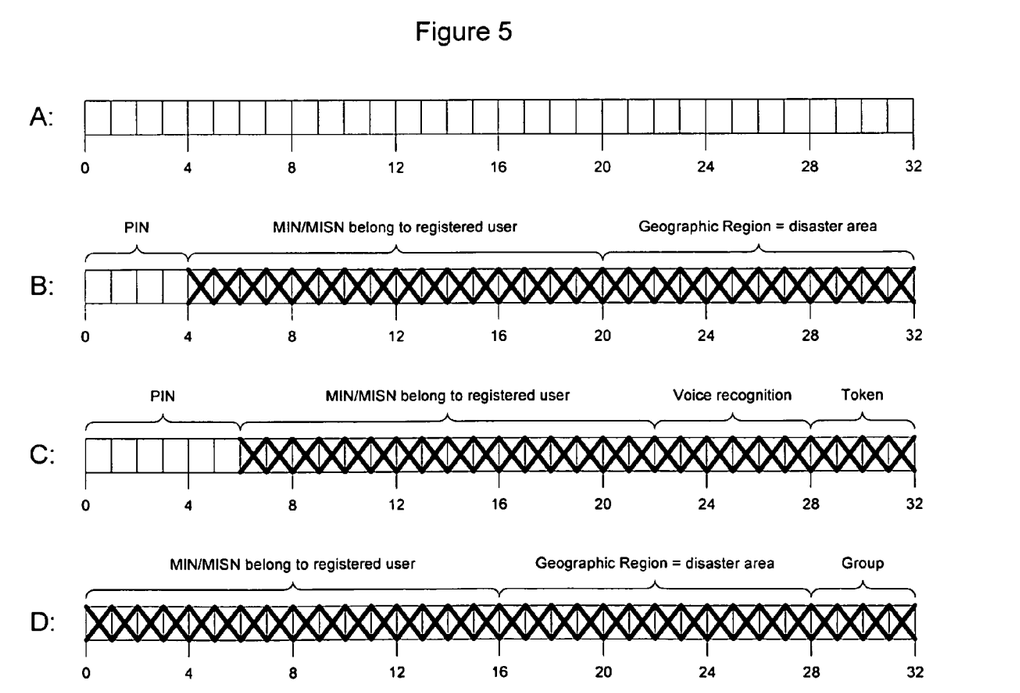
FIG. 5 is a diagram of a weighting process that may be used to reduce the length of a PIN required to obtain access to an emergency communication network.

FIG. 5 shows an alternate embodiment of the invention in which multiple authentication factors are used to reduce the length of the PIN required to be entered by a user to authenticate with the ECN. As shown in FIG. 5, the multiple authentication factors may be weighted differently to individually or collectively reduce the number of digits required by a user when the user would like to use the ECN. For example, as shown in FIG. 5A, where the authentication server is not able to recognize any authentication factors associated with the user, the user may be required to input a full long PIN to obtain access to the ECN. In the illustrated example, it has been assumed that the long PIN is 32 digits long, although other lengths of long PIN are equally applicable.

Where, however, the authentication server is able to recognize particular authentication factors, the length of the PIN may be reduced to enable the user to obtain access to the ECN by entering fewer digits. For example, as shown in FIG. 5B, the authentication server in this example has determined that the MIN/MISN belongs to a registered user and has reduced the length of the PIN required for the user to obtain access to the system by 16 digits. Similarly, the authentication server in this example has determined that the user is in a geographic region that is currently considered a disaster area and has reduced the length of the PIN by 12 digits because of this factor. Thus, as a result, the user is only required to enter a short PIN that is 4 digits long to obtain access to the ECN in this example.

FIG. 5C shows another example in which the length of the PIN has been reduced by 16 digits because the user is calling into the system using a phone that has been registered with the system as belonging to the user, the PIN has been reduced by 6 digits because the system is able to recognize the user's voice, and the PIN has been reduced by 4 digits because the user was able to provide the authentication server with a token. As a result, the PIN required to be entered by the user to obtain access to the ECN has been reduced to 6 digits.

FIG. 5D shows yet another example of how the length of the PIN may be reduced as the authentication server collects authentication information. In the example shown in FIG. 5D, the long 32 digit PIN has been reduced by 16 digits because the phone belongs to the registered user and has been reduced by 12 digits since the user is in a geographic region that has been declared a disaster area. Further, the PIN has been reduced by an additional 4 digits because the user is part of a group that has collectively provided sufficient group authentication information for the system to automatically allow other members associated with the group to obtain direct access to the ECN. Accordingly, in this example, the user is not required to input any PIN to obtain access to the ECN.

In the illustrated examples, the factors may be weighted by causing the different factors to reduce the length of the PIN by a particular number of digits. Thus, whatever factors are present may be used by the system to determine the length of the PIN required to be input by the user. Although the illustrated examples show each authentication factor as providing a particular reduction in PIN length, the invention is not limited in this manner as combinations of authentication factors may combine to provide an increased reduction in PIN length. For example, the geographic region authentication factor may provide an 8 digit reduction in PIN length when taken alone and the MIN/MISN authentication factor may similarly provide an 10 digit reduction in PIN length when taken alone. However, the combination of the geographic region authentication factor and the MIN/MISN authentication factors may provide a 28 digit reduction in PIN length due to the relative strength of the combination of these two authentication factors.

In operation, the user will access the ECN and start entering the long PIN. Once the user has entered a sufficient number of digits (as determined by the system given the other available authentication factors) the user will be interrupted so that the user does not need to complete entry of the entire long PIN.

Although the present invention will work for individual authentication on the ECN, the invention is not limited in this manner as groups of individuals may collectively be authenticated by the authentication server as well. For example, a group of firefighters or other emergency personnel may routinely respond to a particular emergency as a group. To enable group authentication, a group profile may be created containing information associated with the group members, such as the mobile IDs of the communication devices commonly used by the group members. As members of the group authenticate with the authentication server, the authentication server may collect authentication information for the group to reduce the amount of authentication information required for the other group members to authenticate with the ECN. This may enable the group as a whole to be collectively authenticated to enable any communication device associated with the group profile to have access to the ECN. Alternatively, a manager may authenticate with the authentication server to cause the group of communication devices associated with the group profile to be allowed access to the ECN.

Enabling group authentication may be particular important, for example, in telephones equipped with push-to-talk features that provides instant communication between groups of associated telephones without requiring the users to dial telephone numbers. Group communication services could also be automatically set up in the network for groups authenticated by this method such as voice conferencing and video conferencing services.

Figure 4:
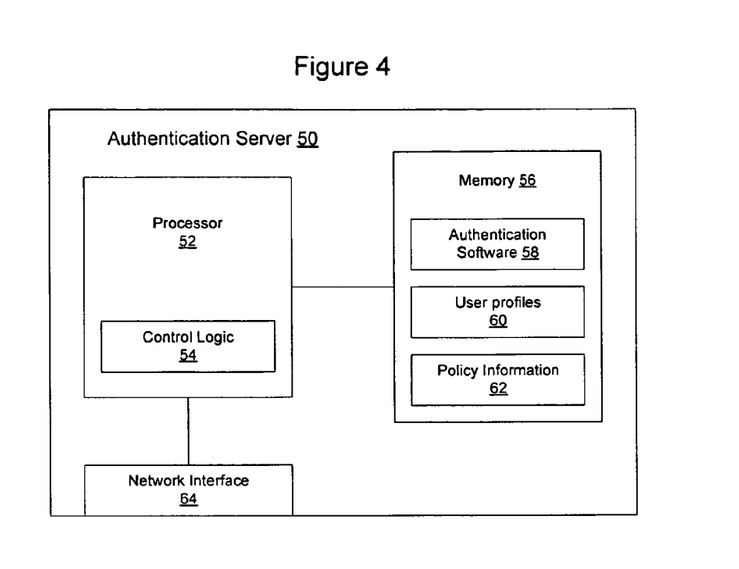
FIG. 4 is a functional block diagram of an authentication server according to an embodiment of the invention.

FIG. 4 shows an embodiment of an authentication server 50 implemented on a computer platform according to an embodiment of the invention. The computer platform may be part of a network element such as a router, switch, application or call server, may be a general purpose computer, or another computer platform configured to perform authentication services on the network.

In the embodiment shown in FIG. 4, the authentication server includes a processor 52 containing control logic 54 configured to implement the functions associated with the authentication server described herein. The authentication server may also include a memory 56 configured to store authentication software 58 and a database of user profiles 60. The user profiles may include the group profiles described above. The control logic 54 may selectively retrieve data and instructions from the memory to enable the processor to implement the functions associated with the authentication service described herein and encoded into the authentication software 58.

The authentication software may include speech recognition software, voice recognition software, fingerprint matching software, retinal scan matching software, and other components configured to enable the authentication software perform biometric information comparisons. Similarly, the authentication software may include other components that will enable it to match available authentication information with information in the user profiles. Other components may be included in the authentication software as well.

As shown in FIG. 4, the authentication server may be pre-populated with profiles 60 of users expected to use the emergency system. The pre-populated information in the user profiles 60 may include the user's normal office, home, and cell phone calling numbers, mobile phone MIN or IMSI numbers, spoken passwords, and the standard long PIN code, and 4-6 digit short PIN code. For convenience to the user, the four to six digit short PIN code may simply be the first 4-6 digits of the long PIN code. The user profiles may also contain biometric information such as the user's hashed fingerprint scan signatures and voiceprint recognition signatures. Other information may be included in the user profiles 60 as well.

As described in greater detail above, the authentication server may use the authentication information supplied by the network and the user, in connection with the information contained in the user profiles 60, to determine whether the user should be allowed access to the ECN. As an example, if the authentication server receives a legitimate user's wireline calling line ID, it may prompt the user to supply the simpler 4-6 digit short PIN code, and/or analyze the user's spoken password before giving access to the system. As another example, if the authentication server receives a legitimate user's mobile MIN code from the network, and receives the user's location from the cellular system which indicates the user is in an emergency zone, the user may be given automatic priority access without further prompting or delay. As yet another example, if a user is calling from a telephone not related to their profile, and the system cannot recognize the user's voiceprint and/or short PIN code, the authentication server may prompt the user to input their full long PIN access code. If the user cannot enter the long PIN access code, then the user may be denied access to the system or have the call forwarded to an emergency operator for human intervention. In these examples, various available authentication factors are combined in a flexible and weighted process to result in strong yet minimally intrusive authentication for the ECN.

The memory may also contain policy information 62 enabling a system administrator to alter the manner in which the weighting process is accomplished so that the authentication server's response to a particular set of authentication factors may be adjusted in a desired manner.

The authentication server may include other components commonly found on standard computer platforms. For example, the authentication server may include a network interface 50 configured to enable messages to be received by the authentication server for processing in connection with the authentication service described herein. Many of these components have been omitted to avoid obfuscation of the invention.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing access to an emergency communication network, the method comprising the steps of:
    authenticating a user to authorize the user to access a public communication network, the emergency communication network being implemented as a priority access system to the public communication network to enable authorized users of the emergency communication network to obtain preferential access to network resources of the public communication network during an emergency ahead of non-authorized users, the preferential access enabling the authorized user to place or receive telephone calls on the public communication network or to initiate a request for data over the public communication network;
    collecting multiple authentication factors associated with the user, no single factor being sufficient to authenticate the user sufficiently to enable the user to access the emergency communication network;
    applying the multiple authentication factors to a weighted authentication process; and
    determining, from the weighted authentication process, a level of access to the emergency communication network to be provided to the user.

2. The method of claim 1, wherein the step of applying the multiple authentication factors comprises applying separate weighting factors to each of the collected authentication factors.

3. The method of claim 1, wherein the level of access to the emergency communication network is selected from a plurality of levels of access.

4. The method of claim 3, wherein the plurality of levels of access comprise a no access level and at least two differentiated access levels.

5. The method of claim 1, wherein the emergency communication network is Government Emergency Telecommunications Service (GETS) or the Nationwide Wireless Priority Service (WPS), and wherein one of the authentication factors is a short Personal Identification Number (PIN) having no more than six digits.

6. The method of claim 5, wherein the step of applying the multiple authentication factors is performed by an authentication server associated with the GETS/WPS.

7. The method of claim 6, wherein at least one of the authentication factors is derived from other users of the network the other users being part of a group of users collectively authenticating along with the user on the emergency communication network.

8. The method of claim 6, wherein the authentication factors comprise at least one biometric authentication factor.

9. The method of claim 8, wherein the at least one biometric authentication factor comprises at least one of fingerprint information, voice information, and retinal scan information.

10. The method of claim 1, wherein the authentication factors comprise at least a Mobile Identification Number or an International Mobile Subscriber Identity number associated with a telephone being used to access the emergency communication network and location of the user within an emergency zone.

11. The method of claim 1, wherein the step of applying the multiple authentication factors to a weighted authentication process comprises weighting the authentication factors according to their reliability.

12. The method of claim 1, further comprising the step of prompting the user for at least one additional authentication factor when the result of the step of determining indicates that the user will not be provided with access to the emergency communication network.

13. A method of enabling in-bound calls to an emergency communication network, the method comprising the steps of:
    receiving, by the emergency communication network, authentication information associated with an authorized user of the emergency communication network, the emergency communication network being implemented as a priority access system to a public communication network to enable authorized users of the emergency communication network to obtain preferential access to network resources on the public communication network during an emergency ahead of non-authorized users;
    associating, by the emergency communication network, telephone information with the authorized user;
    receiving, by the emergency communication network, a setup request from a second user, the setup request identifying the authorized user of the emergency communication network and requesting establishment of a communication session with the authorized user of the emergency communication network; and
    enabling the communication session associated with the setup request to be established using at least some of the resources associated with the emergency communication network based on the authentication information associated with the authorized user without requiring the second user to authenticate with the emergency communication network or have authorization to use the emergency communication network.

14. A method of authenticating a group of users of an emergency communication network, the method comprising the steps of:
- authenticating a plurality of users to authorize each of the plurality of users to access a public communication network, the emergency communication network being implemented as a priority access system to the public communication network to enable authorized users of the emergency communication network to obtain preferential access to network resources of the public communication network during an emergency ahead of non-authorized users;
- establishing a group association between a plurality of potential users of the emergency communication network;
- receiving authentication information from at least one of the potential users of the group association in connection with a request for access by the at least one potential user to the emergency communication network;
- authenticating the at least one of the potential users using the authentication information on the emergency communication network; and
- using the authentication information from the at least one of the potential users in connection with authenticating other potential users of the emergency communication network;
- wherein the step of using the authentication information comprises using the authentication information in a weighted authentication process; and
- wherein the step of authenticating the at least one of the potential users using the authentication information further comprises enabling access to the emergency communication network for the potential users in the group association without requiring authentication by the other potential users.

15. The method of claim 14, wherein the step of using the authentication information comprises reducing a number of authentication factors required by other potential members to obtain access to the emergency communication network.

16. The method of claim 15, wherein the step of using the authentication information comprises reducing a length of a Personal Identification Number required to be input by the other potential members to obtain access to the emergency communication network.

17. The method of claim 14, further comprising the step of establishing a talk group for members of the group association on the emergency communication network.

18. The method of claim 17, wherein the step of establishing a talk group for members of the group association enable members of the group to use push-to-talk services to communicate with other members of the group.

* * * * *